United States Patent
Chaudhry et al.

(10) Patent No.: US 6,721,855 B2
(45) Date of Patent: Apr. 13, 2004

(54) USING AN L2 DIRECTORY TO FACILITATE SPECULATIVE LOADS IN A MULTIPROCESSOR SYSTEM

(75) Inventors: Shailender Chaudhry, San Francisco, CA (US); Marc Tremblay, Menlo Park, CA (US)

(73) Assignee: Sun Microsysytems, Inc., Santa Clara, CA (US)

( * ) Notice: Subject to any disclaimer, the term of this patent is extended or adjusted under 35 U.S.C. 154(b) by 34 days.

(21) Appl. No.: 10/184,214

(22) Filed: Jun. 26, 2002

(65) Prior Publication Data

US 2002/0199070 A1 Dec. 26, 2002

Related U.S. Application Data

(60) Provisional application No. 60/301,197, filed on Jun. 26, 2001.

(51) Int. Cl.$^7$ ............................................. G06F 12/00
(52) U.S. Cl. ..................... 711/137; 711/122; 711/141; 711/146; 712/234; 712/237; 712/239
(58) Field of Search ................... 711/133, 137, 711/122, 141, 146; 712/234, 237, 239

(56) References Cited

U.S. PATENT DOCUMENTS

| | | | | |
|---|---|---|---|---|
| 5,611,063 | A | * 3/1997 | Loper et al. | 712/205 |
| 6,418,516 | B1 | * 7/2002 | Arimilli et al. | 711/138 |
| 6,473,833 | B1 | * 10/2002 | Arimilli et al. | 711/122 |
| 6,606,702 | B1 | * 8/2003 | Guthrie et al. | 712/218 |
| 6,609,192 | B1 | * 8/2003 | Guthrie et al. | 712/216 |

OTHER PUBLICATIONS

Reinman, et al., "Predictive Techniques for Aggressive Load Speculation", © 1998, IEEE, p. 1–11.*

Hwang et al., "An X86 Load/store Unit with Aggressive Scheduling of Load/store Operations", ©198, Parallel and Distributed Systems, Proceedings., 1998 International Conference on, p. 1–8.*

Ma et al., "Symbolic Cache: Fast Memory Access Based on Program Syntax Correlation of Loads and Stores", © IEEE, p 54–61.*

IBM Technical Disclosure Bulletin entitled "L1/L2 Organization Multiple Level Cache for Computer System Data Sharing," vol. 30, No. 9, Feb. 1988, XP–000036527.

(List continued on next page.)

*Primary Examiner*—Donald Sparks
*Assistant Examiner*—Brian R. Peugh
(74) *Attorney, Agent, or Firm*—Park, Vaughan & Fleming LLP

(57) ABSTRACT

One embodiment of the present invention provides a system that facilitates speculative load operations in a multiprocessor system. This system operates by maintaining a record at an L2 cache of speculative load operations that have returned data values through the L2 cache to associated L1 caches, wherein a speculative load operation is a load operation that is speculatively initiated before a preceding load operation has returned. In response to receiving an invalidation event, the system invalidates a target line in the L2 cache. The system also performs a lookup in the record to identify affected L1 caches that are associated with speculative load operations that may be affected by the invalidation of the target line in the L2 cache. Next, the system sends replay commands to the affected L1 caches in order to replay the affected speculative load operations, so that the affected speculative load operations take place after invalidation of the target line in the L2 cache.

25 Claims, 18 Drawing Sheets

OTHER PUBLICATIONS

Publication entitled "A Scalable Approach to Thread–Level Speculation," by J. Gregory Steffan et al., XP–000928711, ACM 2000, ISCA 2000 Vancouver BC Canada, p. 1–12.

Publication entitled "The Stanford Hydra CMP," by Lance Hammond et al., XP–000908498, IEEE, Mar.–Apr. 2000, pp. 71–84.

Publication entitled "Data Speculation Support for a Chip Multiprocessor," by Lance Hammond et al., XP–000787299, 1998 ACM, pp. 58–69.

Publication entitled "The MAJC Architecture: A Synthesis of Parallelism and Scalability," by Marc Tremblay et al., XP–002239487, IEEE, 2000, pp. 12–25.

* cited by examiner

USING AN L2 DIRECTORY TO FACILITATE SPECULATIVE LOADS IN A MULTIPROCESSOR SYSTEM

RELATED APPLICATIONS

This application hereby claims priority under 35 U.S.C. §119 to U.S. Provisional Patent Application No. 60/301,197, filed on Jun. 26, 2001, entitled "Using An L2 Directory To Facilitate Speculative Loads in a Multiprocessor System," by inventors Shailender Chaudhry and Marc Tremblay. The subject matter of this application is also related to the subject matter in a co-pending non-provisional application by the same inventors as the instant application and filed on the same day as the instant application entitled, "Method and Apparatus for Facilitating Speculative Loads in a Multiprocessor System," having serial number 10/186,118, and filing date Jun. 26, 2002 (Attorney Docket No. SUN-P5999-RA). The subject matter of this application is also related to the subject matter in a co-pending non-provisional application by the same inventors as the instant application and filed on the same day as the instant application entitled, "Method and Apparatus for Facilitating Speculative Stores in a Multiprocessor System," having serial number 10/186,091, and filing date Jun. 26, 2002 (Attorney Docket No. SLN-P6001-RA).

BACKGROUND

1. Field of the Invention

The present invention relates the design of multiprocessor systems. More specifically, the present invention relates to a method and an apparatus for facilitating speculative load operations and/or speculative store operations in a multiprocessor system.

2. Related Art

In order to achieve high rates of computational performance, computer system designers are beginning to employ multiple processors that operate in parallel to perform a single computational task. One common multiprocessor design includes a number of processors 151–154 coupled to level one (L1) caches 161–164 that share a single level two (L2) cache 180 and a memory 183 (see FIG. 1). During operation, if a processor 151 accesses a data item that is not present in local L1 cache 161, the system attempts to retrieve the data item from L2 cache 180. If the data item is not present in L2 cache 180, the system first retrieves the data item from memory 183 into L2 cache 180, and then from L2 cache 180 into L1 cache 161.

Note that coherence problems can arise if a copy of the same data item exists in more than one L1 cache. In this case, modifications to a first version of a data item in L1 cache 161 may cause the first version to be different than a second version of the data item in L1 cache 162.

In order to prevent such coherency problems, computer systems often provide a coherency protocol that operates across bus 170. A coherency protocol typically ensures that if one copy of a data item is modified in L1 cache 161, other copies of the same data item in L1 caches 162–164, in L2 cache 180 and in memory 183 are updated or invalidated to reflect the modification.

Coherence protocols typically perform invalidations by broadcasting invalidation messages across bus 170. However, as multiprocessor systems increase in performance, such invalidations occur more frequently. Hence, these invalidation messages can potentially tie up bus 170, and can thereby degrade overall system performance.

In order to remedy this problem, some designers have begun to explore the possibility of maintaining directory information within L2 cache 180. This directory information specifies which L1 caches contain copies of specific data items. This allows the system to send invalidation information to only the L1 caches that contain the data item instead of sending a broadcast message to all L1 caches. (This type of system presumes that there exist separate communication pathways for invalidation messages to each of the L1 caches 161–164, unlike the example illustrated in FIG. 1, which uses a single shared bus 170 to communicate with L1 caches 161–164.)

As multiprocessor systems continue to increase in performance, it is becoming increasingly harder to support memory models that significantly restrict the ordering of load and store operations. One commonly used memory model is the "Total Store Order" (TSO) memory model. Under the TSO memory model, loads and stores from a given processor typically execute in program order, except that loads can overtake previous stores. More specifically, under the TSO memory model: loads cannot overtake previous loads; stores cannot overtake previous stores; and stores cannot overtake previous loads. However, loads can overtake previous stores. This allows previous stores to take place in a lazy fashion while the system performs subsequent loads.

Unfortunately, placing these restrictions on the ordering of load and store operations can seriously degrade multiprocessor performance, because the multiprocessor system often has to wait for previous memory operations to complete before executing subsequent memory operations.

A less restrictive memory model is "release consistency," in which the only restriction is that processors see a consistent view of shared data whenever a critical region is exited. This memory model is less restrictive than TSO and can lead to better multiprocessor performance. Unfortunately, many existing legacy applications make use of restrictive memory models, such as TSO.

Hence, in order to run these legacy applications, what is needed is a method and an apparatus for facilitating efficient parallel execution of programs under a restrictive memory model, such as the TSO memory model.

SUMMARY

One embodiment of the present invention provides a system that facilitates speculative load operations in a multiprocessor system. The system operates by maintaining a record of speculative load operations that have completed at a processor in the multiprocessor system, wherein a speculative load operation is a load operation that is speculatively initiated before a preceding load operation has returned. Next, the system receives an invalidation signal at an L1 cache that is coupled to the processor, wherein the invalidation signal indicates that a specific line in the L1 cache is to be invalidated. In response to this invalidation signal, the system examines the record of speculative load operations to determine if there exists a matching speculative load operation that is completed and is directed to the same location in the L1 cache that the invalidation signal is directed to. If there exists a matching speculative load operation, the system replays the matching speculative load operation so that the matching speculative load operation takes place after an event that caused the invalidation signal completes.

In one embodiment of the present invention, the record of speculative load operations includes a plurality of banks, wherein each bank contains speculative load operations directed to a specific bank of the L2 cache.

In one embodiment of the present invention, the record of speculative load operations maintains set and way information for entries in the L1 cache that contain results of speculative load operations.

In one embodiment of the present invention, the invalidation signal is received as a result of a cache coherency protocol operation.

In one embodiment of the present invention, the invalidation signal is received as a result of a store operation associated with the specific line in the L1 cache.

In one embodiment of the present invention, invalidation signal is received as a result of an invalidation of a corresponding line in the L2 cache.

In one embodiment of the present invention, the record of speculative load operations includes an indicator for each speculative load operation. This indicator specifies whether the speculative load operation has completed.

In one embodiment of the present invention, maintaining the record of speculative load operations involves updating the record whenever a new speculative load operation completes.

In one embodiment of the present invention, the system receives a replay signal at the processor from the L2 cache, wherein the replay signal identifies a specific set and way location. In response to this replay signal, the system replays any speculative load operation that has completed and is directed to the specific set and way location. Note that he system performs this replay without performing a corresponding invalidation.

In one embodiment of the present invention, the multiprocessor system implements a total store ordering (TSO) memory model in which loads can overtake previous stores, loads cannot overtake previous loads, stores cannot overtake previous loads, and stores cannot overtake previous stores.

Another embodiment of the present invention provides a system that facilitates speculative load operations in a multiprocessor system. This system operates by maintaining a record at an L2 cache of speculative load operations that have returned data values through the L2 cache to associated L1 caches, wherein a speculative load operation is a load operation that is speculatively initiated before a preceding load operation has returned. In response to receiving an invalidation event, the system invalidates a target line in the L2 cache. The system also performs a lookup in the record to identify affected L1 caches that are associated with speculative load operations that may be affected by the invalidation of the target line in the L2 cache. Next, the system sends replay commands to the affected L1 caches in order to replay the affected speculative load operations, so that the affected speculative load operations take place after invalidation of the target line in the L2 cache.

In one embodiment of the present invention, maintaining the record involves receiving a load miss operation from an L1 cache at the L2 cache, wherein the load miss operation contains information specifying whether there exists a speculative load operation that has returned for an L1 cache location associated with the load miss operation. If there exists such a speculative load operation, the system updates the record to indicate that the L1 cache is associated with the speculative load operation.

In a variation on this embodiment, the load miss operation identifies the L1 cache location associated with the load miss operation, and updating the record involves recording the L1 cache location in the record, thereby enabling a subsequent replay command to include the L1 cache location. If the load miss operation is not speculative, the system updates the record to indicate that an associated entry in the L1 cache is not associated with a returned speculative load operation.

In one embodiment of the present invention, if replay commands are sent to one or more L1 caches for an L2 cache line, the system updates the record to indicate that the L2 cache line is no longer associated with returned speculative load operations.

In one embodiment of the present invention, the L2 cache includes a reverse directory including entries for lines in L1 caches, wherein each entry identifies an associated entry in the L2 cache. In a variation on this embodiment, the reverse directory includes a fixed entry corresponding to each entry in each of the L1 caches. In a variation on this embodiment, each entry in the reverse directory includes information specifying a location of a corresponding entry in the L2 cache.

One embodiment of the present invention provides a system for facilitating speculative store operations in a multiprocessor system. This system operates by maintaining a record of speculative store operations that are in process at an L2 cache in the multiprocessor system, wherein a speculative store operation is a store operation that is speculatively executed before a preceding store operation has returned. Upon receiving a load operation at the L2 cache from an L1 cache, the system examines the record of speculative store operations to determine if there exists a matching speculative store operation that is directed to the same location that the load operation is directed to. If so, the system ensures that the load operation takes place after the matching speculative store operation completes.

In one embodiment of the present invention, ensuring that the load operation takes place after the matching speculative store operation completes involves sending a retry operation to the processor to cause the processor to retry the load operation at a later time.

In one embodiment of the present invention, ensuring that the load operation takes place after the matching speculative store operation completes involves waiting for the matching speculative store operation to complete before completing the load operation at the L2 cache.

In one embodiment of the present invention, upon completion of the matching speculative store operation at the L2 cache, the L2 cache allows the load operation to take place and sends invalidation signals to other L1 caches containing lines that are invalidated by the matching speculative store operation.

In one embodiment of the present invention, upon receiving a speculative store operation from a processor at the L2 cache, the system stores the speculative store operation in the record.

In one embodiment of the present invention, upon completion of a store operation at the L2 cache, the system sends an acknowledgement to a source processor that initiated the store operation. Upon receiving a move signal from the source processor in response to the acknowledgement, the system updates the record to indicate that the given store operation is no longer speculative.

In a variation on this embodiment, upon receiving the acknowledgement at the source processor, the source processor waits until all preceding store operations complete before sending the move signal to the L2 cache.

In a variation on this embodiment, upon completion of the store operation at the L2 cache, the system sends invalidation signals to L1 caches containing cache lines that are overwritten by the store operation.

In one embodiment of the present invention, for each processor coupled to the L2 cache, the record of speculative store operations includes a store queue containing speculative store operations.

In one embodiment of the present invention, the L2 cache includes a plurality of banks, and for each L2 bank, the record of speculative store operations includes a store queue for each processor coupled to the L2 cache.

In one embodiment of the present invention, the system receives a read-to-own request for a target cache line in order to perform a given store operation to the target cache line. Upon receiving the read-to-own request, the system examines the record of speculative store operations to determine if there exists a matching speculative store operation that is directed to the target cache line. If so, the system passes the target cache line to the requesting processor in a write-only state, so that the requesting processor is able to perform a write operation (but not a read operation) to the target cache line, thereby avoiding a deadlock condition.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Multiprocessor System

Figure 1A:
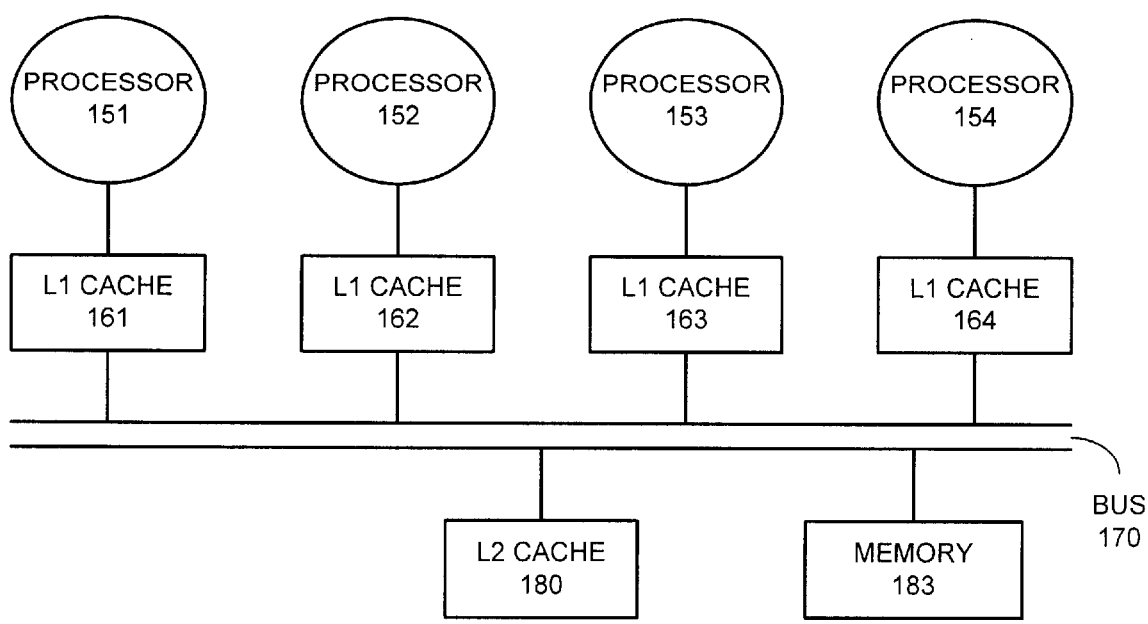
FIG. 1A illustrates a multiprocessor system.
Figure 1B:
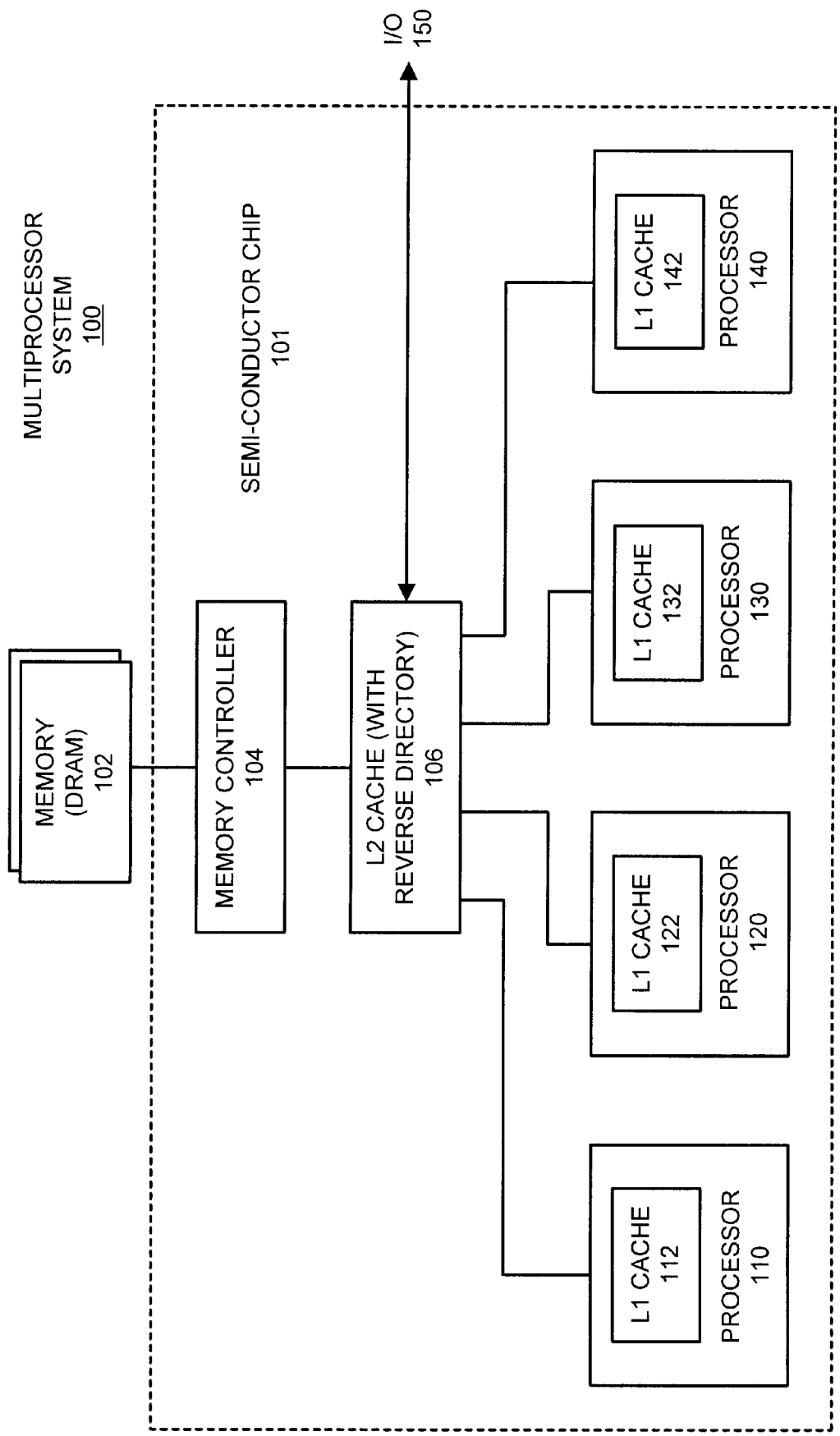
FIG. 1B illustrates a multiprocessor system with a reverse directory in accordance with an embodiment of the present invention.

FIG. 1B illustrates a multiprocessor system 100 with a reverse directory in accordance with an embodiment of the present invention. Note much of multiprocessor system 100 is located within a single semiconductor chip 101. More specifically, semiconductor chip 101 includes a number of processors 110, 120, 130 and 140, which contain level one (L1) caches 112, 122, 132 and 142, respectively. Note that the L1 caches 112, 122, 132 and 142 may be separate instruction and data caches, or alternatively, unified instruction/data caches. L1 caches 112, 122, 132 and 142 are coupled to level two (L2) cache 106, which includes a reverse directory 302, which is described in more detail with reference to FIGS. 3–6 below. L2 cache 106 is coupled to off-chip memory 102 through memory controller 104.

In one embodiment of the present invention, L1 caches 112, 122, 132 and 142 are write-through caches, which means that all updates to L1 caches 112, 122, 132 and 142 are automatically propagated to L2 cache 106. This simplifies the coherence protocol, because if processor 110 requires a data item that is present in L1 cache 112, processor 110 can receive the data from L2 cache 106 without having to wait for L1 cache 112 to source the data.

L2 Cache with Multiple Banks

Figure 2:
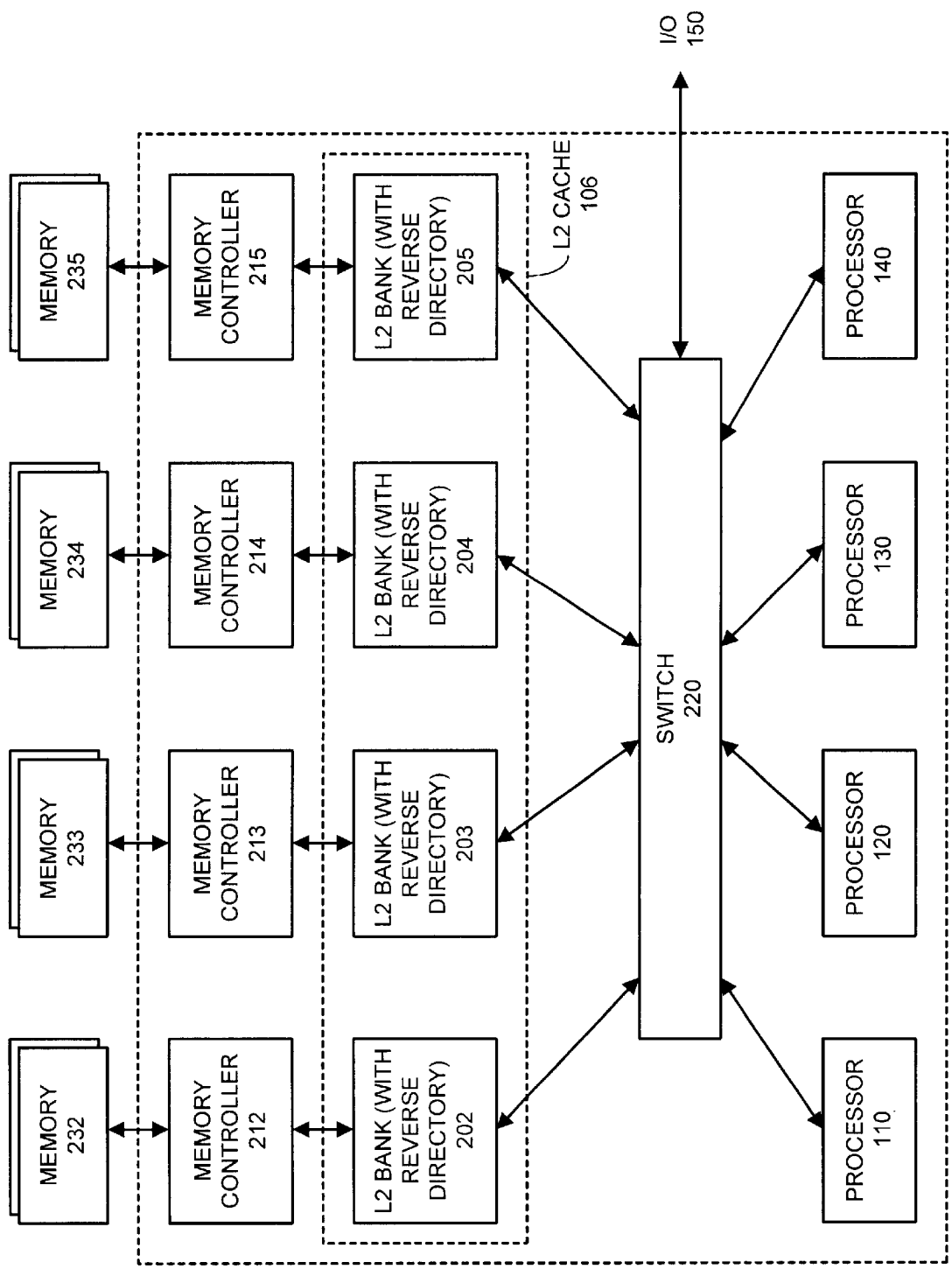
FIG. 2 illustrates an L2 cache with multiple banks within a multiprocessor system in accordance with an embodiment of the present invention.

FIG. 2 illustrates an L2 cache 106 with multiple banks in accordance with an embodiment of the present invention. In this embodiment, L2 cache 106 is implemented with four banks 202–205, which can be accessed in parallel by processors 110, 120, 130 and 140 through switch 220. Note that only two bits of the address are required to determine which of the four banks 202–205 a memory request is directed to. Switch 220 additionally includes an I/O port 150 for communicating with I/O devices. Also note that each of these banks 202–205 includes a reverse directory. Furthermore, each of the banks 202–205 has its own memory controller 212–215, which is coupled to an associated bank of off-chip memory 232–235.

Note that with this architecture, it is possible to concurrently connect each L1 cache to its own bank of L2 cache, which increases the bandwidth to the L2 cache 106.

Reverse Directory

Figure 3:
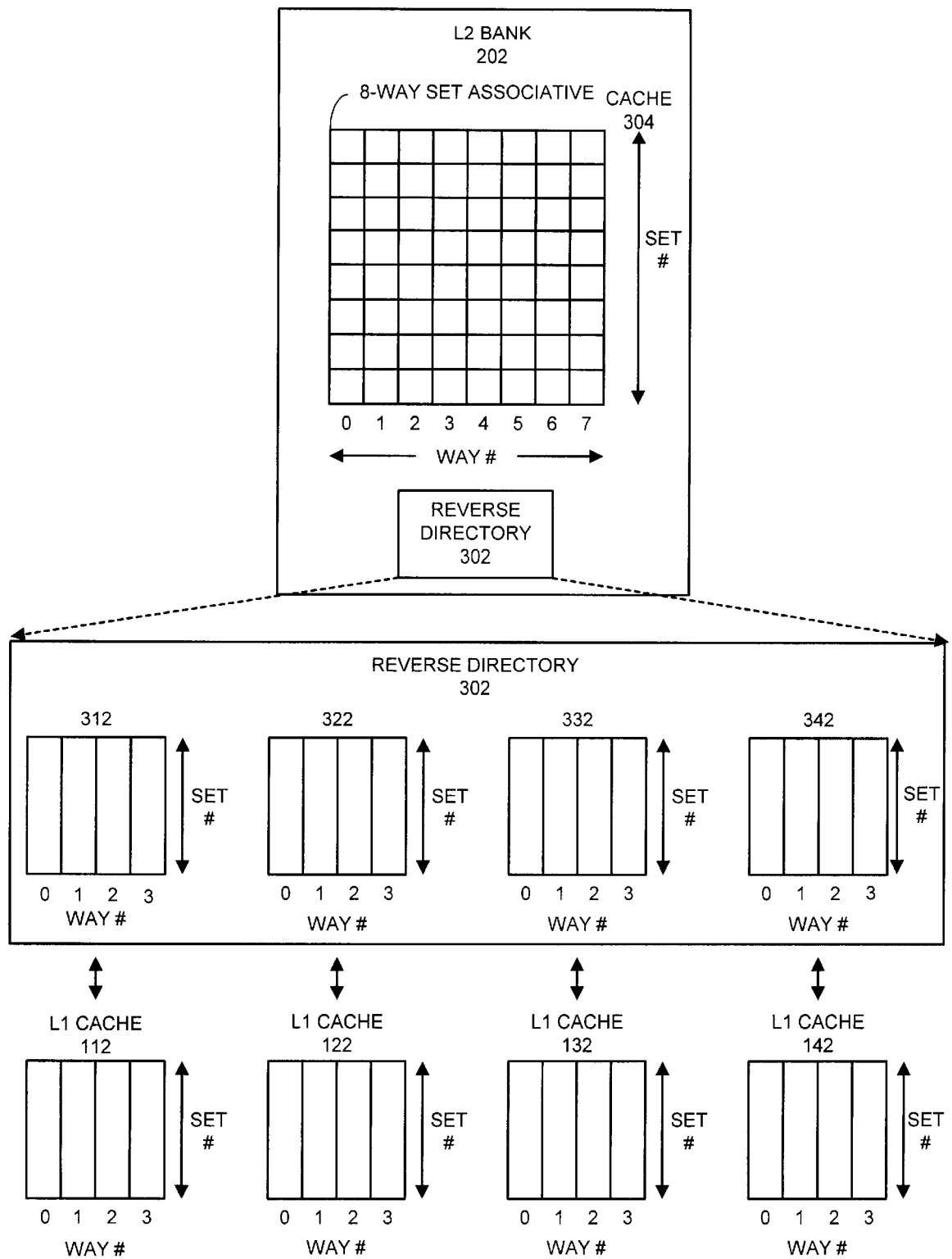
FIG. 3 illustrates a reverse directory in accordance with an embodiment of the present invention.

FIG. 3 illustrates L2 bank 202 along with an associated reverse directory 302 in accordance with an embodiment of the present invention. L2 bank 202 contains an eight-way set associative cache 304 for storing instructions and data. A portion of the address is used to determine a set within cache 304, which is represented by a row of cache 304. Within a given set, eight different entries can be stored in each of eight different "way locations," which are represented by the eight columns in cache 304.

Reverse directory 302 includes a separate block for each L1 cache. More specifically, block 312 is associated with L1 cache 112, block 322 is associated with L1 cache 122, block 332 is associated with L1 cache 132, and block 342 is associated with L1 cache 142.

Note that each of these blocks 312, 322, 332 and 342 includes an entry for each line in the associated L1 caches 112, 122, 132 and 142. Moreover, since L1 cache 112 is organized as a four-way set associative cache, the associated block 312 within reverse directory 302 is also organized in the same fashion. However, note that entries within L1 cache 112 contain data and instructions, whereas entries within the associated block 312 contain indexing information specifying a location of the line within cache 304.

Reverse Directory Entry

Figure 4:
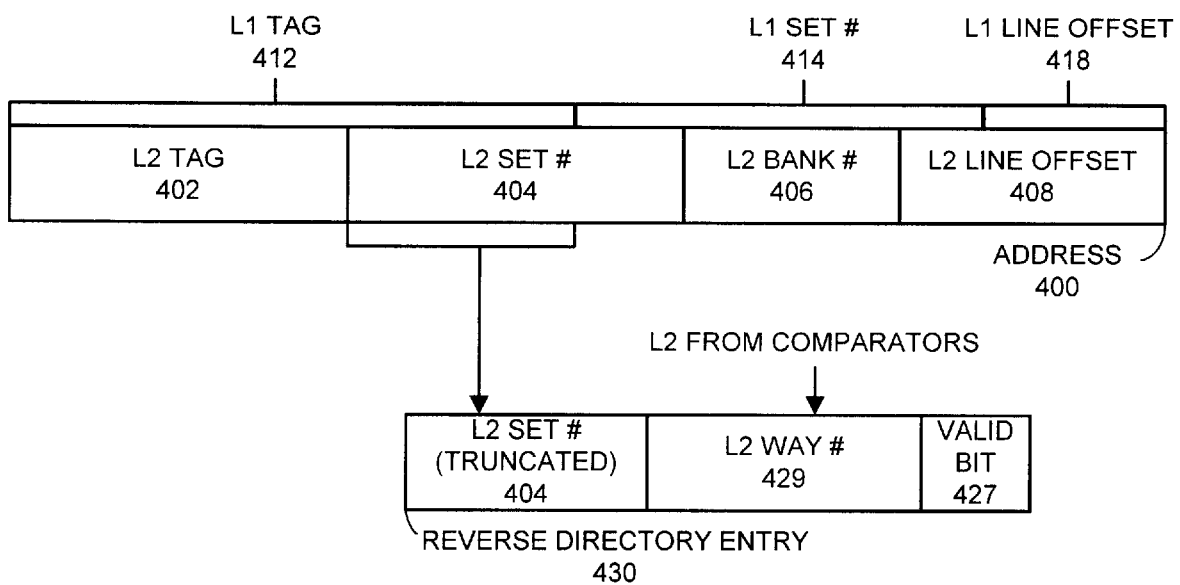
FIG. 4 illustrates a reverse directory entry in accordance with an embodiment of the present invention.

FIG. 4 illustrates how a reverse directory entry 430 is created in accordance with an embodiment of the present invention.

The top portion of FIG. 4 illustrates an address 400 of a data item (or instruction) within memory 102. L1 cache 112 divides this address into L1 tag 412, L1 set number 414, and L1 line offset 418. L1 set number 414 is used to look up a specific set of the four-way set-associative L1 cache 112. L1 tag 412 is stored in L1 cache 112, and is used to perform comparisons for purposes of implementing the four-way set-associative memory for each set. L1 line offset 418 determines a location of a specific data item within the line in L1 cache 112.

L2 cache 106 divides address 400 into L2 tag 402, L2 set number 404, L2 bank number 406 and L2 line offset 408. L2 bank number 406 determines a specific bank from the four banks 202–205 of L2 cache 106. L2 set number 404 is used to look up a specific set of the eight-way set-associative bank of L2 cache 106. L2 tag 402 is stored in a specific bank of L2 cache 106, and is used to perform comparisons for purposes of implementing the eight-way set-associative memory for each set. L2 line offset 408 determines a location of a specific data item within the line in L2 cache 106.

The associated entry 430 for address 400 within reverse directory 302 contains truncated L2 set number 424, L2 way number 429 and valid bit 427. Truncated L2 set number 424 includes the portion of L2 set number 404 which cannot be determined from the location of the entry within L1 cache 112. In other words, it contains the portion of L2 set number 404, which does not overlap with L1 set number 414. L2 way number 429 contains a three-bit index which specifies a column location of the line, out of the eight possible way locations for the line, in cache 304. Finally, valid bit 427 indicates whether entry 430 is valid.

Note that instead of storing an L1 cache location for each line within L2 cache 106, the illustrated embodiment stores an entry for each L1 cache location, and each of these entries specifies an L2 cache location that is associated with the L1 location.

Hence, one can think of directory 302 as a "reverse directory" because instead of keeping a pointer to an L1 entry from each L2 entry, it keeps a pointer in the reverse direction from each L1 entry to a corresponding L2 entry. This saves memory because there are typically many fewer L1 entries than L2 entries.

Process of Creating a Reverse Directory Entry

Figure 5:
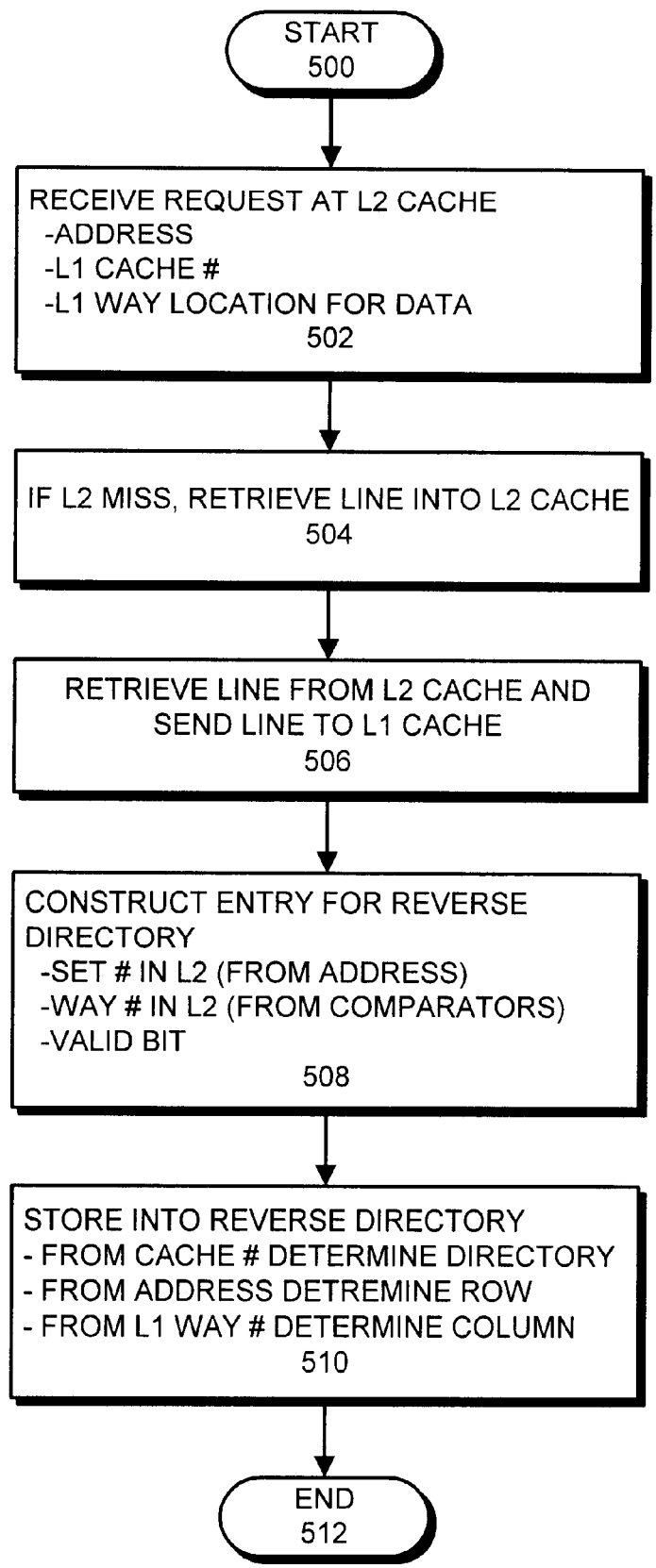
FIG. 5 is a flow chart illustrating the process of creating or updating a reverse directory entry in accordance with an embodiment of the present invention.

FIG. 5 is a flow chart illustrating the process of creating or updating a reverse directory entry in accordance with an embodiment of the present invention. The process starts when a request to retrieve a line is received at L2 cache 106 from L1 cache 112 (step 502). This request includes address 400, an L1 cache number that identifies L1 cache 112, and a way location in L1 cache 112 into which the line will be stored after it is retrieved.

Next, if the request generates a miss in L2 cache 106, the system retrieves the line into L2 cache 106 from memory 102 (step 504). If this retrieval causes and existing entry in L2 cache 106 to be invalidated, then the corresponding entries in reverse directory 302 may have to be invalidated.

The system then retrieves the line from L2 cache 106 and sends to line to L1 cache 112 (step 506).

The system also constructs an entry 430 for reverse directory 302 (step 508). This entry includes truncated L2 set number 424, L2 way number 429 and valid bit 427 as is descried above with reference to FIG. 4.

The system then stores the entry into a location in reverse directory 302 (step 510). The location is determined by a number of items. From L2 bank number 406, the system knows to look into L2 bank 202. From the L1 cache number, the system knows to look a block 312, which is associated with L1 cache 112. From address 400, the system determines a row that is associated with a specific L1 set. From the L1 way location received with the request, the system determines a column within the row.

Process of Using a Reverse Directory Entry

Figure 6:
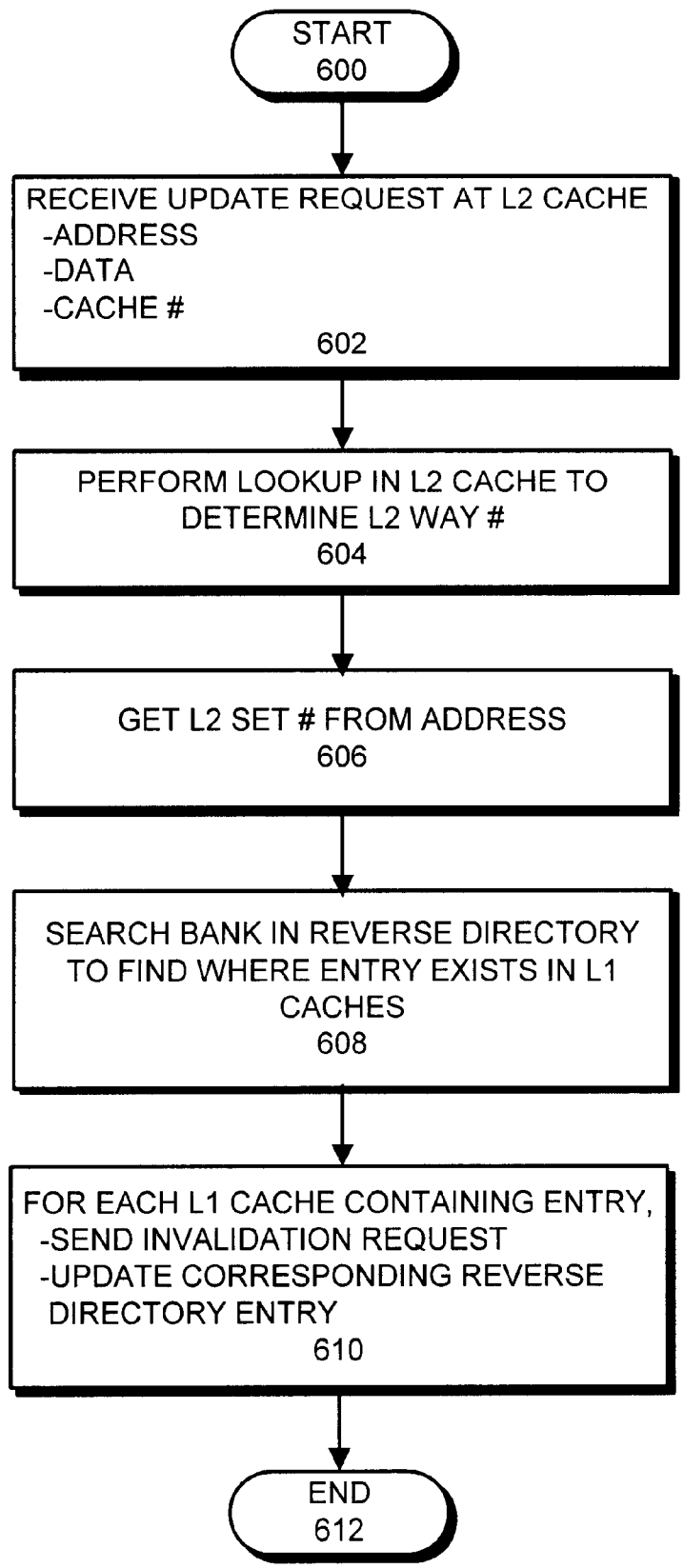
FIG. 6 is a flow chart illustrating the process of using reverse directory entries to perform invalidations in accordance with an embodiment of the present invention.

FIG. 6 is a flow chart illustrating the process of using reverse directory entries to perform invalidations in accordance with an embodiment of the present invention. The system starts by receiving a request that causes an update of L2 cache 106 (step 602). This request can include: a store hit on the target entry by another processor, a load miss, or a store miss.

Next, the system reconstructs the entry for the request in reverse directory 302. This is accomplished by performing a lookup in L2 cache 106 to determine the L2 way number 429 in which the target entry is located (step 604), and retrieving the L2 set number 404 from address 400 as is illustrated in FIG. 4 (step 606). These values are combined to construct the reverse directory entry 430.

Next, the system uses this entry to search reverse directory 302 in order to determine which L1 caches contain the entry (step 608). Note that the system only has to search the reverse directory that is associated a bank of L2 cache 106 that is specified by L2 bank number 406. Also note that if the request is a store hit by another processor, the system does not have to search the bank for the processor that caused the store hit.

For each L1 cache that contains the entry, the system sends an invalidation message to the L1 cache. This invalidation message includes the L1 way number, so that an associative lookup in the L1 cache can be avoided. The system also updates the corresponding reverse directory entry to indicate that it has been invalidated (step 610).

Replaying a Speculative Load in Response to an Invalidation

Figure 7:
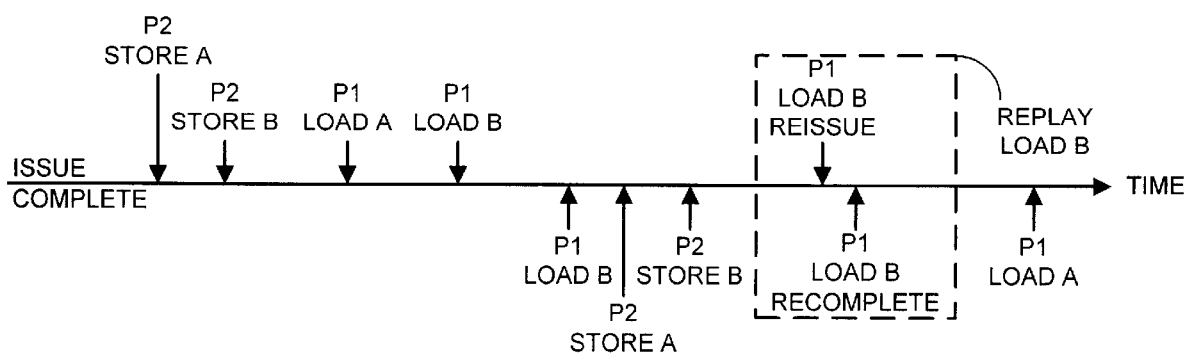
FIG. 7 illustrates a replay of a speculative load operation in response to a related store operation in accordance with an embodiment of the present invention.

FIG. 7 illustrates a replay of a speculative load operation in response to an invalidation signal accordance with an embodiment of the present invention. FIG. 7 includes a time line that progresses from left to right. Instruction issuances are represented by arrows that appear above the time line, while corresponding instruction completions are represented by arrows that appear below the time line.

Starting at the left-hand side of FIG. 7, a store A operation and a store B operation issues from a second processor. Next, a first processor issues a load A operation and then speculatively issues a load B operation before the load A operation completes.

The load B operation subsequently completes before the load A operation completes. This can be a problem for a TSO memory model because the load B operation has overtaken the load A operation, which violates the TSO memory model. However, if no memory operations take place between when the load B operation completes and when the load A operation completes, the fact that the load B operation finished first will not be visible.

However, as is illustrated on FIG. 7, the store A operation and the store B operation from the second processor both complete in the interval between when the load B operation completes and when the load A operation completes. Hence, the load B operation will return the old value of B, while the load A operation returns the new value of A. Consequently, the fact that the load B operation finished before the preceding load A operation is visible to the second processor, which means that the TSO memory model is violated.

In order to remedy this problem, one embodiment of the present invention causes the first processor to replay the load B operation, so that the load B operation takes place after the store B operation completes as is illustrated in FIG. 7.

Figure 8:
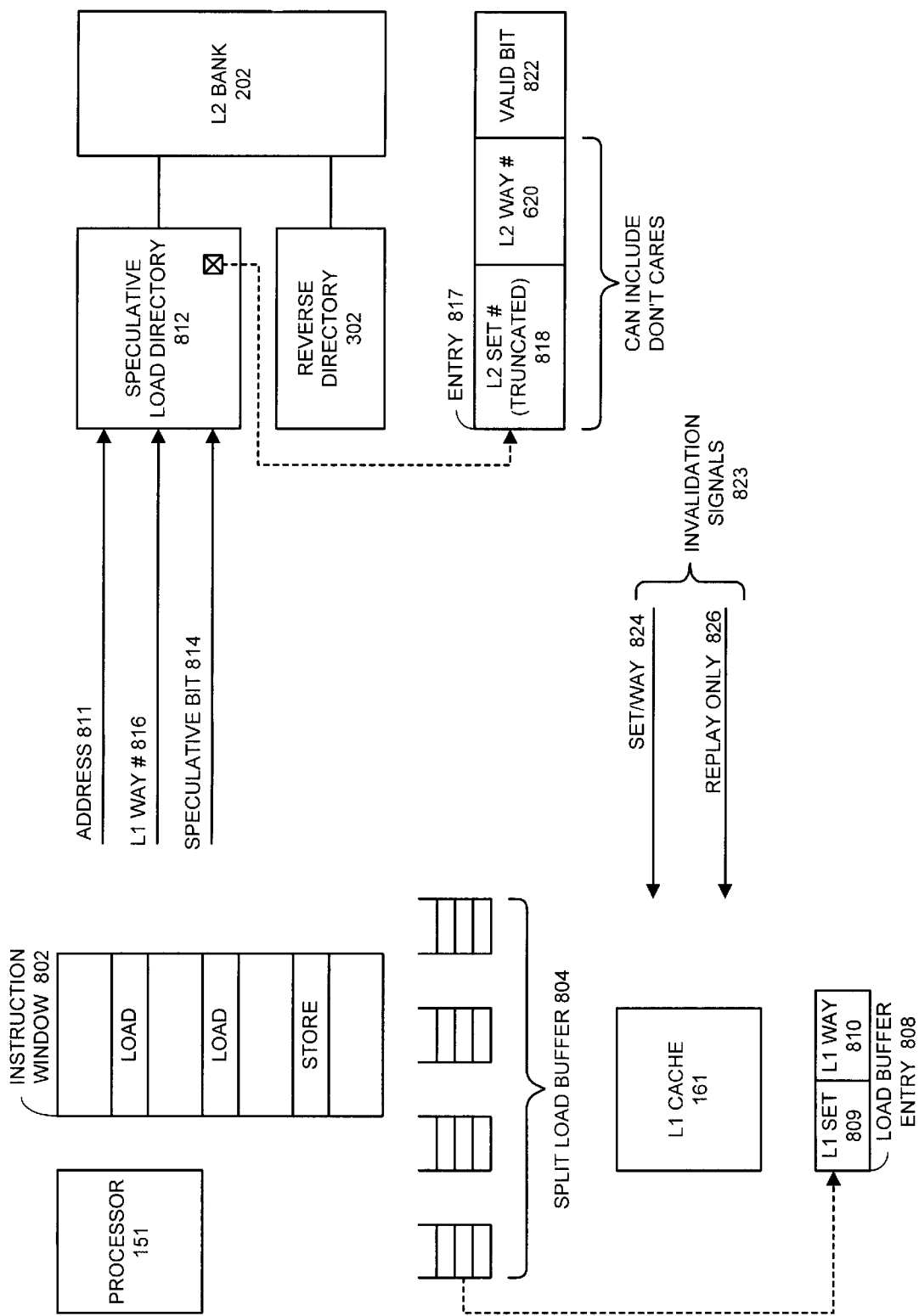
FIG. 8 illustrates various structures involved in a speculative load operation in accordance with an embodiment of the present invention.

FIG. 8 illustrates various structures involved in replaying a speculative load operation in accordance with an embodiment of the present invention. As is illustrated in FIG. 8, processor 151 is associated with an instruction window 802, which contains a list of "in-flight" instructions that have yet to complete. Note instruction window 802 includes a number of load and store operations in program order.

Processor 151 is also associated with a local L1 cache 161 that communicates with L2 cache 106. Note that although only a single L2 bank 202 is illustrated in FIG. 8, L1 cache 161 also communicates with the other L2 banks 203–205, which are not illustrated in FIG. 8.

L1 cache 161 is associated with a split load buffer 804, which keeps track of speculative loads that processor 151 has completed. This allows the system to determine if any completed speculative load operations need to be replayed because of a store operation to the same location.

Note that split load buffer 804 is divided into four queues, one for each L2 bank in multiprocessor system 100. Also note that a given entry 808 in one of the queues contains only the L1 set 809 and the L1 way 810. This is the only information required to determine if an invalidation to a specific set and way in L1 cache 161 necessitates a replay of a completed speculative load operation.

An entry is added to split load buffer 804 every time a speculative load operation is initiated by processor 151. An entry can be retired from split load buffer 108 any time after the entry is no longer speculative, which means that all preceding loads have completed. In one embodiment of the present invention, entries are retired from split load buffer 804 at the same time an associated instruction is retired from instruction window 802.

In one embodiment of the present invention, all speculative loads are stored in split load buffer 804, including speculative load operations that have not completed. In this embodiment, an additional bit is included in each entry to indicate whether the associated speculative load operation has completed or not.

Note that the present invention is not meant to be limited to the precise split load buffer implementation illustrated in FIG. 8. In general, any structure that keeps track of completed speculative load operations can be used.

A number of structures are also located near L2 bank 202. In addition to reverse directory 302, which was described above with reference to FIG. 3, L2 bank 202 is also associated with speculative load directory 812. Speculative load directory 812 is structured similarly to reverse directory 302, except that it keeps track of L1 cache locations that contain completed speculative load operations that may need to be replayed, even if an L1 cache eviction causes reverse directory 302 not to point to the associated L2 cache location. Recall that during a store operation to a line in L2 cache 106, reverse directory 302 is used to determine which L1 caches to send invalidation signals to. In other words, speculative load directory 812 keeps track of L2 cache lines for evicted L1 cache entries that are associated with completed speculative load operations.

Note that if an entry is evicted from an L1 cache, the corresponding entry in reverse directory 302 is removed. However, the system still needs to keep track of L1 cache entries that are associated with completed speculative load operations in order to replay the completed speculative load operations, if an associated L2 cache line is invalidated.

To this end, speculative load directory 812 is used by the system to determine if replay messages need to be sent to specific processors containing completed speculative load operations. The structure of speculative load directory 812 essentially mirrors the structure of reverse directory 302. Hence, an entry 817 in speculative load directory 812 contains a truncated L2 set number 818, as well as an L2 way number 820 and a valid bit 822. However, entry 817 differs from an entry in reverse directory 302 because L2 set number 818 and L2 way number 820 can contain "don't care" values in addition to zero and one values. A don't care value (sometimes represented as an "X") indicates that the bit can contain either a zero value or a one value. These don't care values allow speculative load directory to keep track of all possible L2 entries are associated with completed speculative load operations for a specific L1 cache location.

Entries in reverse directory 302 and speculative load directory 812 start out in the same state. However, as L1 invalidations cause a specific L1 cache location to point to different L2 cache lines, the corresponding L1 cache entry in speculative load directory 218 begins to fill with don't care values. Note that a new don't care value can generally be computed by exclusive-ORing the existing bits and the new bits for L2 set number 818 and L2 way number 820 to determine which bit positions have changed. Also note that at least two bits are required to represent the three possible values (0, 1, X) for each bit in L2 set number 818 and L2 way number 820.

During a load operation, speculative load directory 812 receives a number of signals from L1 cache 161, including address 811 and L1 way number 816. The signals also include a speculative bit 814, which indicates whether the load operation is directed to an L1 cache location that is also associated with a completed speculative load operation.

During a store operation from an L1 cache, the corresponding L2 cache line is updated, and invalidation signals are sent to all other L1 caches that contain the L2 cache line. This is accomplished by performing a lookup in reverse directory 302 to look up all L1 cache locations that contain the L2 cache line. A similar lookup is performed in speculative load directory 812 to identify L1 cache lines that have been evicted, but are nevertheless associated with completed speculative load operations that are affected by the store to the L2 cache line. When such an evicted L1 cache line is identified, a replay signal is sent to the L1 cache. This is accomplished by sending an additional "replay only" bit 826 to the L1 cache in addition to the L1 set and way information 824. This replay only bit 826 specifies whether the L1 cache line needs to be invalidated in addition to the replay operation, or if only a replay operation is required because the L1 cache line has already been evicted.

Note that the present invention is not meant to be limited to the precise speculative load directory implementation illustrated in FIG. 8. In general, any structure that keeps track of L1 cache locations that are associated with completed speculative load operations that are affected by invalidations of L2 cache lines can be used with the present invention.

Figure 9A:
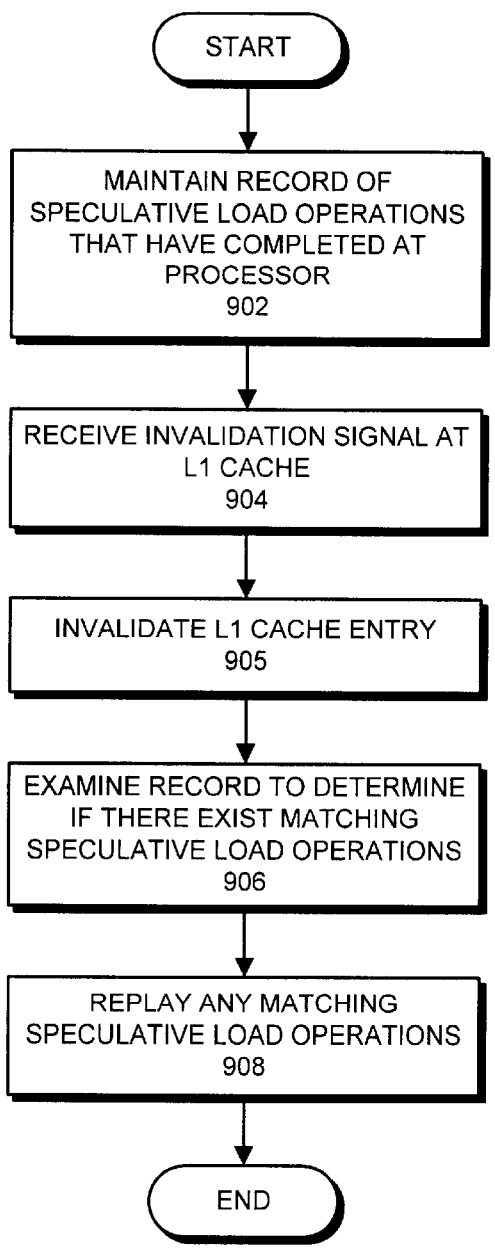
FIG. 9A is a flow chart illustrating a replay of a speculative load operation in response to an invalidation event in accordance with an embodiment of the present invention.

FIG. 9A is a flow chart illustrating a replay of a speculative load operation in response to an invalidation event in accordance with an embodiment of the present invention. The system operates by maintaining at the processor a record of speculative load operations that have completed (step 902). In the embodiment illustrated in FIG. 8, this record is in the form of split load buffer 804. Next, the system receives invalidation signals 823 at L1 cache 161 from L2 bank 202 (step 904). The system uses set and way information 824 from invalidation signals 823 to invalidate a specific entry in L1 cache 161 (step 905). The system also examines the record to determine if there exist any matching speculative load operations that have completed for the same L1 cache entry (step 906). If so, the system replays the matching speculative load operations (step 908).

Replaying a Speculative Load in Response to a Replay Command

Figure 9B:
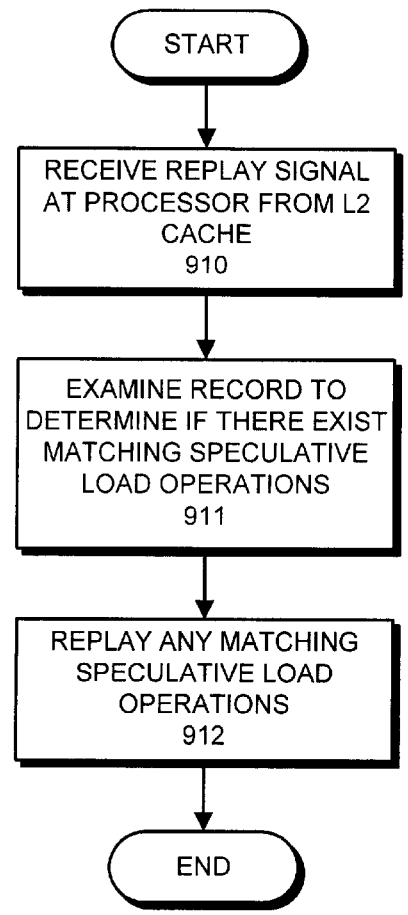
FIG. 9B is a flow chart illustrating a replay of a speculative load operation in response to an explicit replay command in accordance with an embodiment of the present invention.

FIG. 9B is a flow chart illustrating a replay of a speculative load operation in response to an explicit replay command in accordance with an embodiment of the present invention. Upon receiving a replay only signal 826 at L1 cache 161 (step 910), the system examines the record to determine if there exist any matching speculative load operations that have completed for the same L1 cache entry (step 911). If so, the system replays the matching speculative load operations (step 912).

Speculative Load Directory at L2 Cache

Figure 10A:
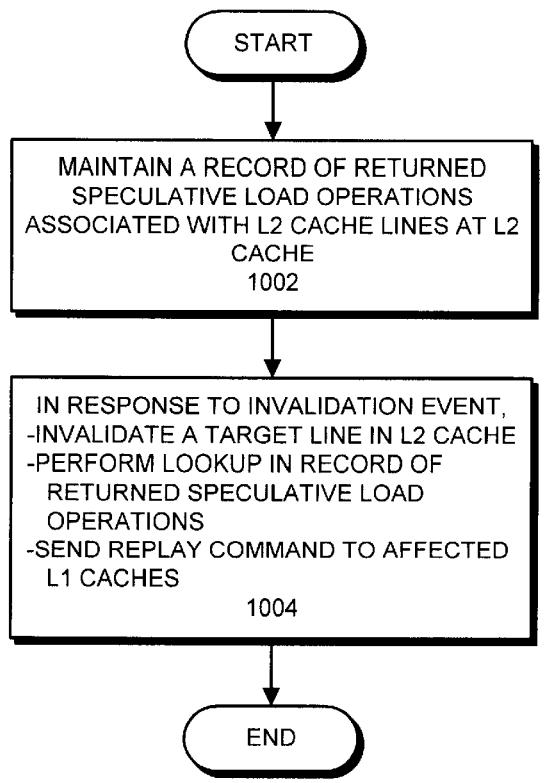
FIG. 10A is a flow chart illustrating operation of a speculative load directory at an L2 cache in accordance with an embodiment of the present invention.

FIG. 10A is a flow chart illustrating operation of a speculative load directory at L2 bank 202 in accordance with an embodiment of the present invention. The system operates by maintaining at L2 bank 202 a record of returned speculative load operations that are associated with specific L2 cache lines (step 1002). In the embodiment of the present invention illustrated in FIG. 8, the record is in the form of speculative load directory 812.

Next, in response to an invalidation event for a target L2 cache line, such as an update to the target L2 cache line, the system performs a number of operations. (1) The system invalidates the target L2 cache line. (2) The system performs a lookup into speculative load directory 812 to identify L1 cache lines that are associated with returned speculative load operations that will be affected by the invalidation of the L2 cache line. Note that the don't care values may cause more matches to be indicated than actually exist. (3) Next, the system sends replay commands (or invalidation signals) to the potentially affected L1 caches to cause the affected speculative load operations to be replayed (step 1004).

Figure 10B:
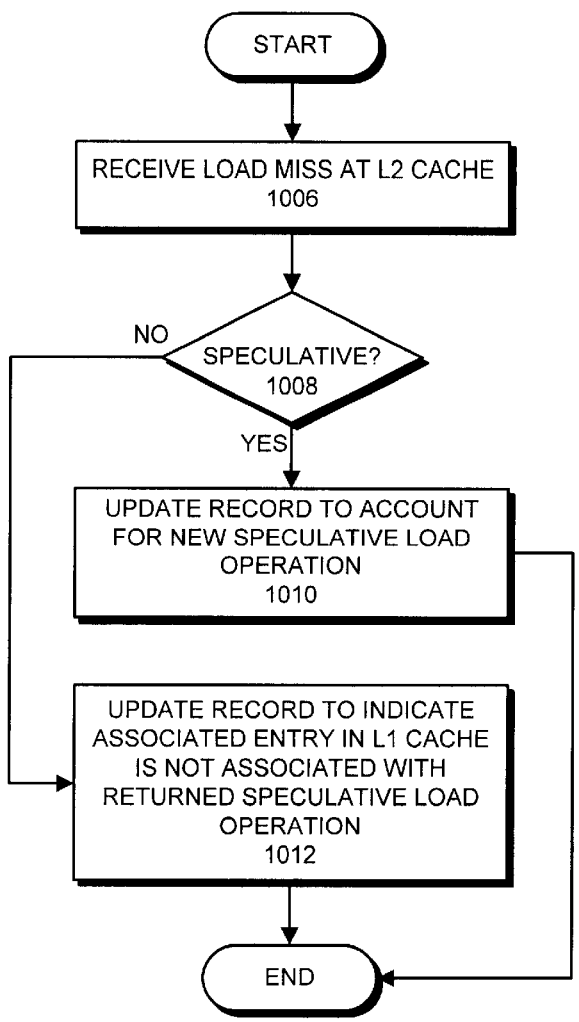
FIG. 10B is a flow chart illustrating updating of a speculative load directory at an L2 cache in accordance with an embodiment of the present invention.

FIG. 10B is a flow chart illustrating updating of a speculative load directory 812 at L2 bank 202 in accordance with an embodiment of the present invention. The system operates by receiving a load miss at L2 bank 202 from an L1 cache (step 1006). Next, the system examines speculative bit 814 to determine if the load miss is speculative, which means the load miss is associated with an L1 cache entry for which speculative load a operation has completed (step 1008). If so, the system updates speculative load directory 812 to account for the additional speculative load operation (step 1010). If the load miss causes an L1 cache entry in reverse directory 302 to point to a new L2 cache line, the corresponding entry in speculative load directory 812 is updated with don't care bits so that it covers both the old L2 cache line and the new L2 cache line.

If the load miss is not speculative, the system updates the record to indicate that the associated L1 cache entry is not associated with a returned speculative load operation (step 1012). This is done by clearing all of the don't care bits to make the entry in speculative load directory 812 the same as the corresponding entry in reverse directory 302. The fact that the load miss was not marked as speculative indicates that all preceding load operations have completed for the L1 cache location. This means that the speculative load operations associated with the L1 cache location are no longer speculative.

Replaying a Speculative Load in Response to a Speculative Store

Figure 11:
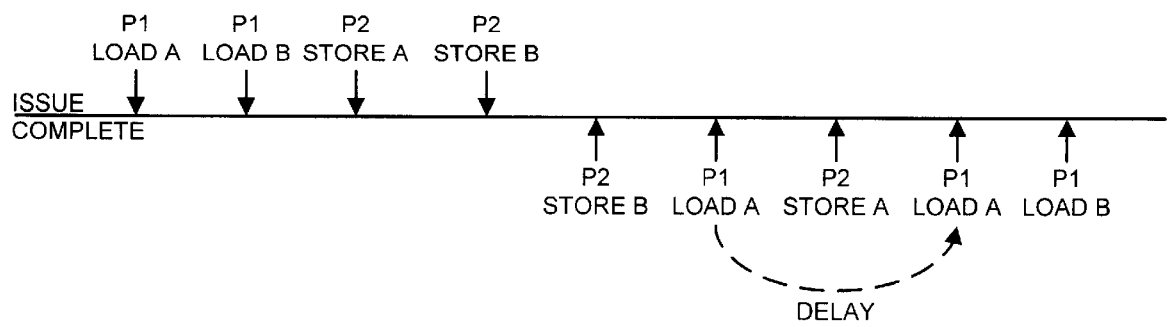
FIG. 11 illustrates a replay of a speculative load operation caused by a completed speculative store operation in accordance with an embodiment of the present invention.

FIG. 11 illustrates a replay of a speculative load operation caused by a completed speculative store operation in accordance with an embodiment of the present invention. FIG. 11 illustrates a time line that progresses from left to right. Instruction issuances are represented by arrows that appear above the time line, while corresponding instruction completions are represented by arrows that appear below the time line.

In the example illustrated in FIG. 11, a first processor issues a load A operation and then speculatively issues a load B operation before the preceding load A operation completes. Next, a second processor issues store A operation and then speculatively issues a store B operation before the preceding store A operation completes. The store B operation subsequently completes before the store A operation completes.

This can be a problem for a TSO memory model because the store B operation has overtaken the store A operation, which violates the TSO memory model. However, if no memory operations take place between when the store B operation completes and when the store A operation completes, the fact that the store B finished first will make no difference.

However, as is illustrated on FIG. 11, the load A operation from the first processor completes in the interval between when store B completes and when store A completes for the first processor. Hence, the load A operation will return the old value of A, while the load B operation returns the new value of B. Consequently, the fact that the store B operation finished before the preceding store load A operation is visible, which means that the TSO memory model has been violated.

In order to remedy this problem, one embodiment of the present invention causes the completion of the load A operation to be delayed until after the store A operation completes. This can be accomplished by treating the load A operation as if a cache miss occurred, and by treating the completion of the store A operation as the line fill for the cache miss. In this way, the completion of the store A operation will cause the load A operation to complete.

In another embodiment of the present invention, the L2 cache sends a retry signal to the L1 cache that originated the load A operation. This causes the L1 cache to retry the load A operation at a later time, after the store A operation completes.

Note that store operations cannot be replayed because store operations destroy data values stored in memory. Hence, the present invention gets around this problem by delaying or replaying intervening load instructions so that the out-of-order completion of the store instructions is not visible.

Speculative Store Operation

Figure 12:
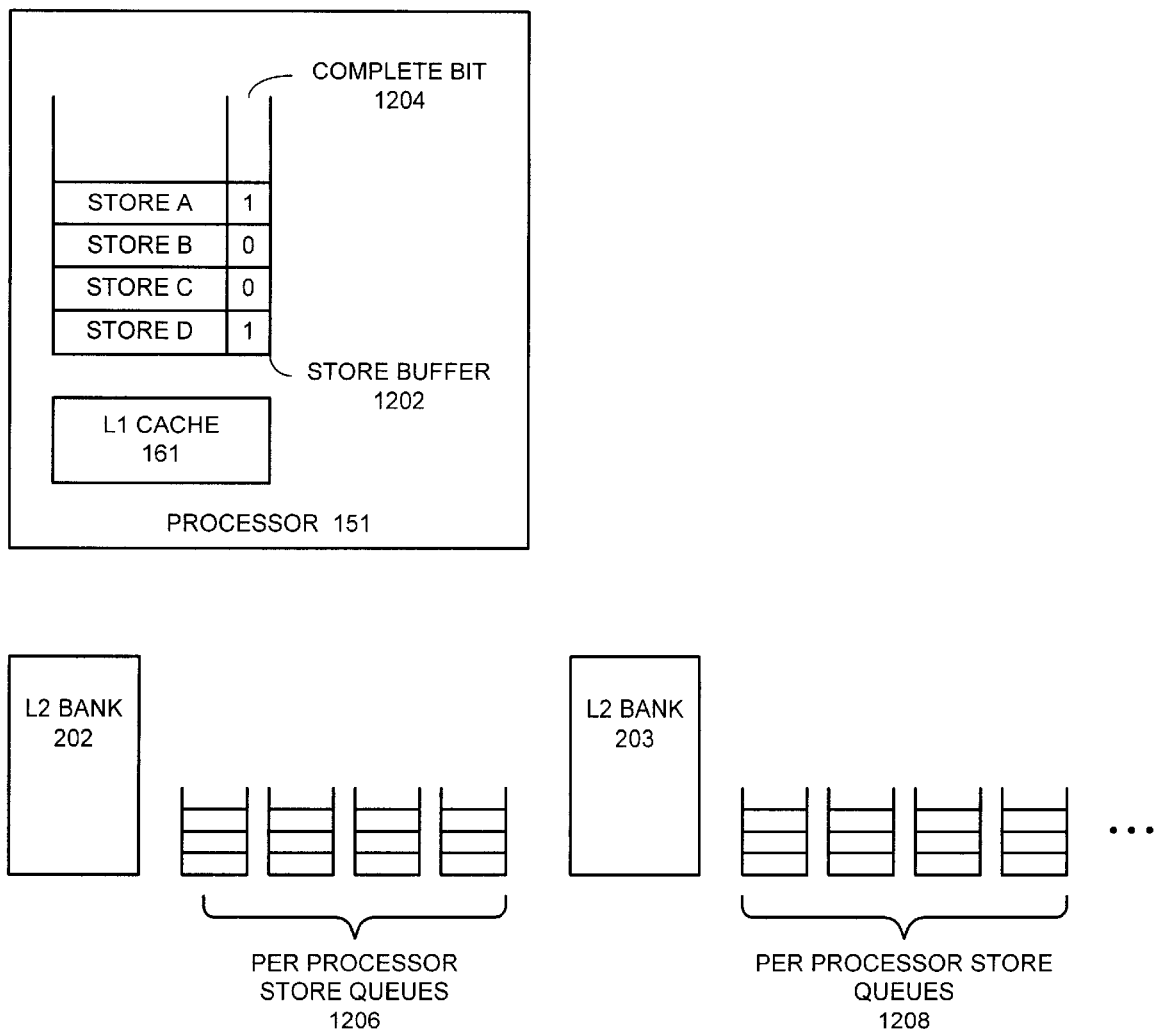
FIG. 12 illustrates various structures involved in a speculative store operation in accordance with an embodiment of the present invention.

FIG. 12 illustrates various structures involved in a speculative store operation in accordance with an embodiment of the present invention. As is illustrated in FIG. 12, processor 151 includes an L1 cache 161, and is associated with a store buffer 1202.

Store buffer 1202 keeps track of pending store operation. To this end, store buffer 1202 includes an additional "complete" bit for each entry, which indicates whether or not an acknowledgement has been received from lower levels of the memory hierarchy indicating that the store operation is complete.

At L2 cache 106, each L2 bank includes a per processor store queue for each of the processors 110, 120, 130 and 140. FIG. 12 illustrates per processor store queues 1206 and 1208 for L2 bank 202 and L2 bank 203, respectively. Per processor store queues also exist for L2 banks 204–205, but they are not illustrated in FIG. 12.

Per processor store queues 1206 and 1208 contain speculative store operations that have not completed from each processor. This allows the system to determine whether it is necessary to delay subsequent load operations until a given speculative store operation completes.

Figure 13A:
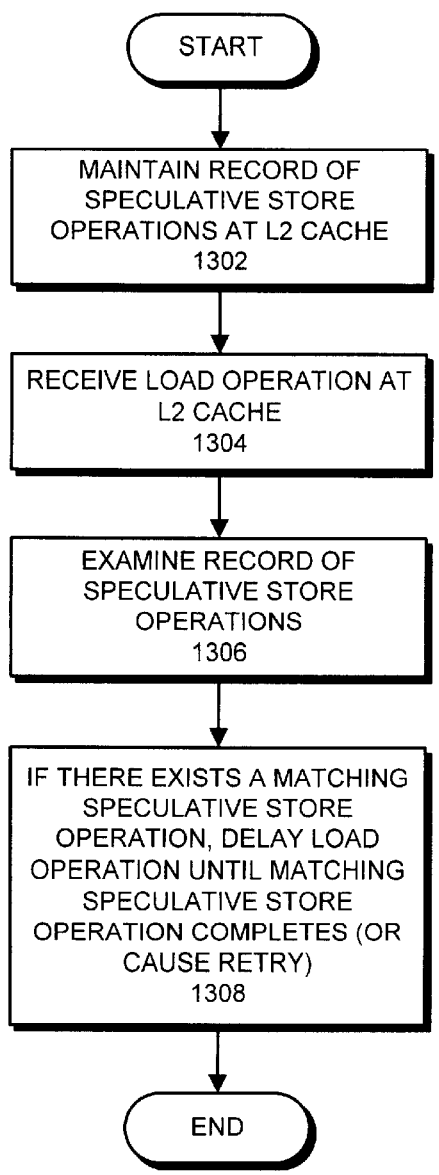
FIG. 13A is a flow chart illustrating a delay of a speculative load operation in response to a related speculative store operation in accordance with an embodiment of the present invention.

FIG. 13A is a flow chart illustrating the process or delaying a speculative load operation in response to a related speculative store operation in accordance with an embodiment of the present invention. The system starts by maintaining a record of speculative store operations (step 1302). In the embodiment of the present invention illustrated in FIG. 12, this record takes the form of per processor store queues 1206 and 1208.

Next, the system receives a load operation at L2 bank 202 (step 1304). The system then examines the per processor store queues to determine if the load matches any outstanding speculative store operations (step 1306). If so, the system delays the load operation until the matching speculative store operation completes (step 1308). As was mentioned above, this may involve either delaying completion of the load operation until the store completes, or causing the load operation to be retried.

Figure 13B:
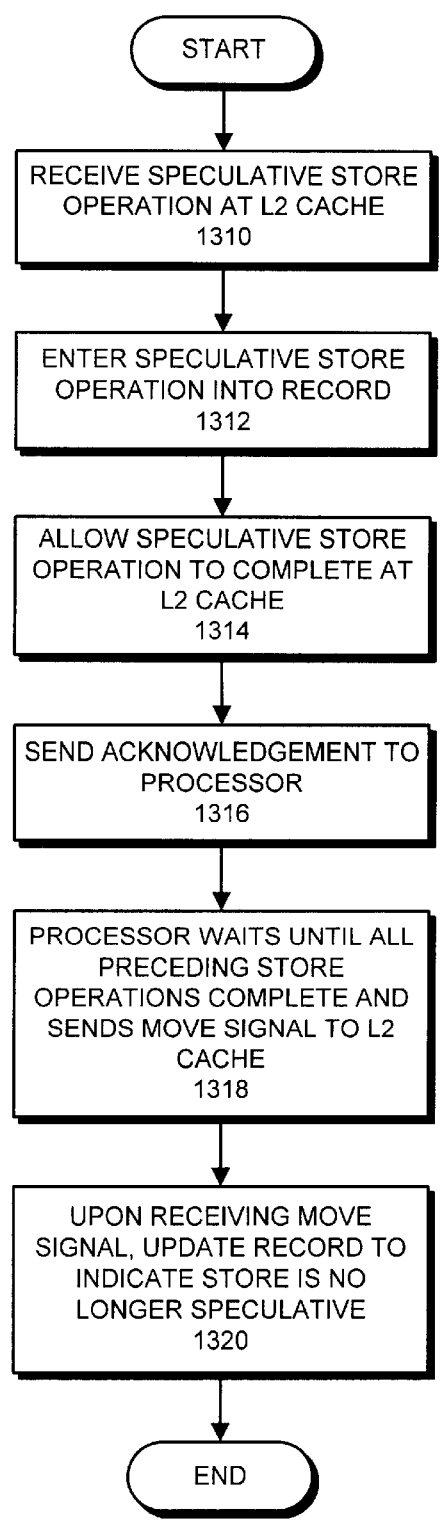
FIG. 13B is a flow chart illustrating updating of speculative store information at an L2 cache in accordance with an embodiment of the present invention.

FIG. 13B is a flow chart illustrating updating of speculative store information at L2 bank 202 in accordance with an embodiment of the present invention. Upon receiving a speculative store operation from processor 151 at L2 bank 202 (step 1310), the system enters the speculative store operation into the store queue associated with the processor 151 (step 1312). The system then allows the store operation to complete at L2 bank 202 (step 1314). L2 bank 202 then sends an acknowledgement to processor 151 indicating that the speculative store operation has completed (step 1316). Next, processor 151 waits until all preceding store operations complete, and then sends a "move" command back to L2 bank 202 (step 1318). Note that processor 151 is able to tell when all preceding store operations complete by examining store buffer 1202 at processor 151. Finally, upon receiving a move signal from processor 151, L2 cache updates the per processor store queues 1206 to indicate that the store operation is no longer speculative (step 1320). Note that this can be accomplished by removing the store operation from per processor store queues 1206.

Using a Write-Only State for Deadlock Avoidance

Figure 14:
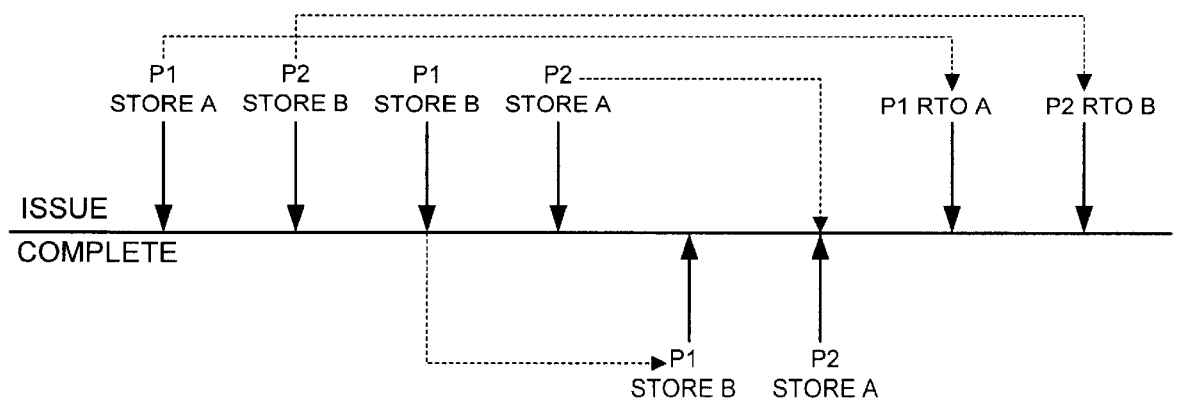
FIG. 14 illustrates a potential deadlock condition caused by replay operations in accordance with an embodiment of the present invention.

FIG. 14 illustrates a potential deadlock condition caused by replay operations in accordance with an embodiment of the present invention. FIG. 14 illustrates a time line that progresses from left to right. Instruction issuances are represented by arrows that appear above the time line, while corresponding instruction completions are represented by arrows that appear below the time line.

In the example illustrated in FIG. 14, a first processor issues a store A operation and a second processor issues a store B operation. Next, the first processor speculatively issues a store B operation before the store A operation completes. Similarly, the second processor speculatively issues a store B operation before the store A operation completes.

Next, the speculative store B operation by the first processor completes before the preceding store A operation by the first processor completes. Similarly, the speculative store A operation by the second processor completes before the preceding store B operation by the first processor completes.

Subsequently, the store A operation for the first processor causes a request-to-own (RTO) operation to take place on memory element A as part of a cache coherency protocol. Note that the first processor needs to perform the RTO A operation in order to gain ownership of memory element A, so that the first processor can modify memory element A to complete the store A operation. Similarly, the second processor causes an RTO B operation to take place on memory element B in order to gain ownership of memory element B, so that the second processor can modify memory element B to complete the store B operation.

However, since memory element A is the subject of a speculative store operation by the second processor, the RTO A operation by the first processor causes the RTO A operation to be delayed until the preceding store B operation by the second processor completes. Similarly, since memory element B is the subject of a speculative store operation by the first processor, the RTO B operation by the second processor causes the RTO B operation to be delayed until the preceding store A operation by the first processor completes. This results in a deadlock condition between the first processor and the second processor.

Figure 15:
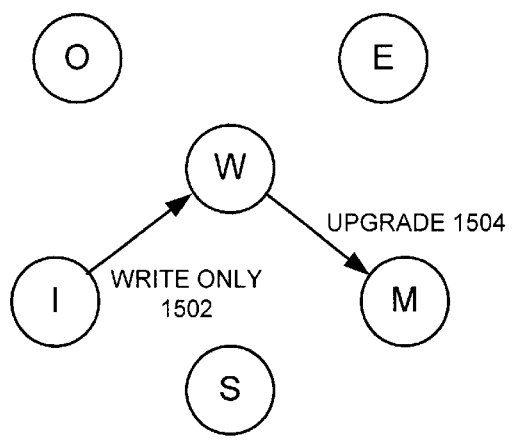
FIG. 15 illustrates a portion of a state diagram for a cache coherency protocol in accordance with an embodiment of the present invention.

One embodiment of the present invention avoids this deadlock condition by introducing a "write-only" cache line state signified by the letter "W" into a cache coherency protocol (see FIG. 15). Referring to FIG. 15, this cache coherency protocol includes all of the usual state transitions between the following MOESI states: modified (M), owned (O), exclusive (E), shared (S) and invalid (I) states. These standard MOESI transitions are not shown for purposes of clarity. In addition, the protocol includes a write-only "W" state.

During operation of the system, when a processor performs an RTO operation on a cache line for which there exists a speculative store operation, the processor receives the cache line in the write-only state. When the cache line is no longer speculative, this write-only state is upgraded to a modified state.

Figure 16:
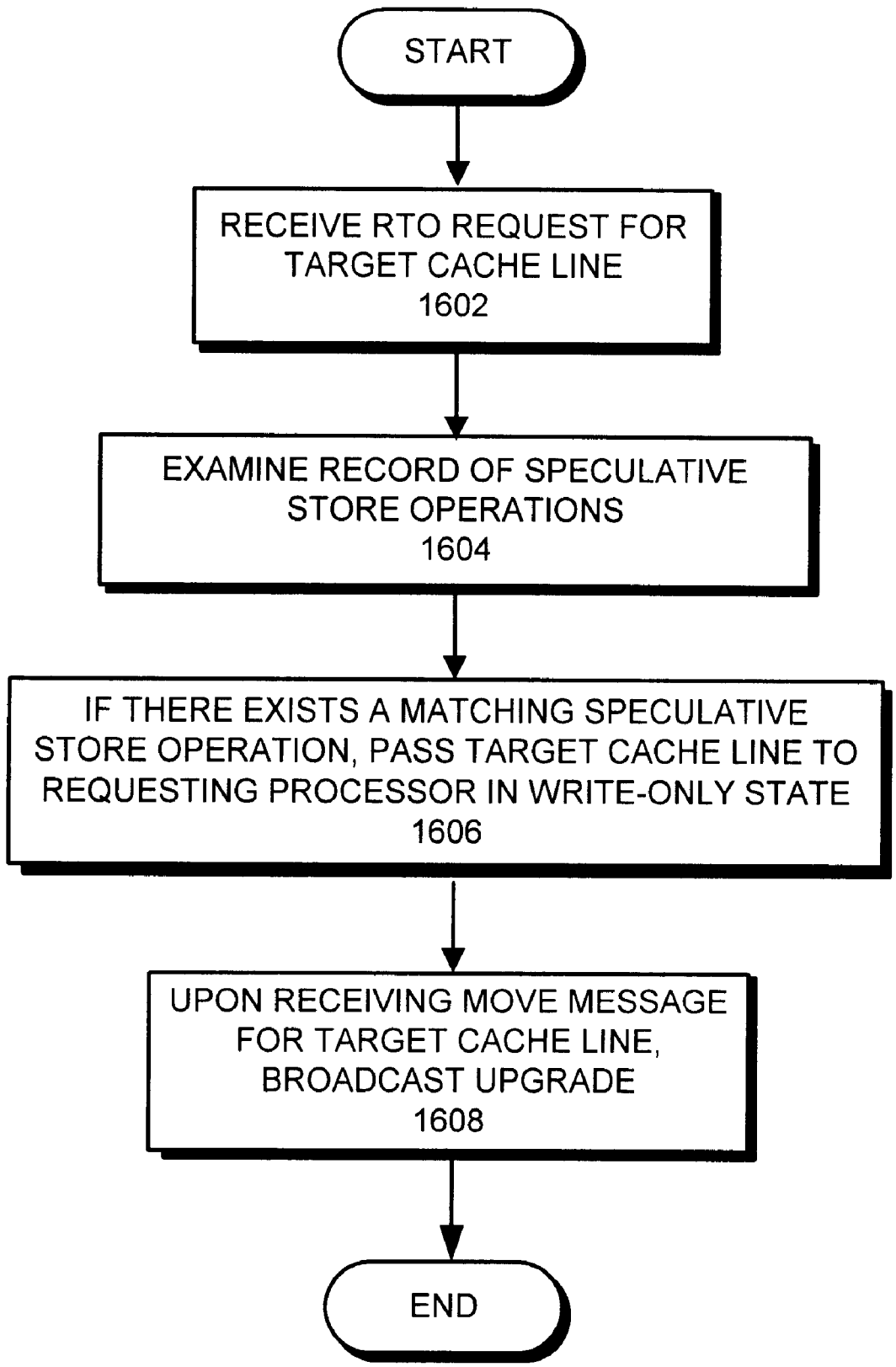
FIG. 16 is a flow chart illustrating the process of using a write-only state to avoid a deadlock condition in accordance with an embodiment of the present invention.

More specifically, FIG. 16 is a flow chart illustrating the process of using the write-only state to avoid a deadlock condition in accordance with an embodiment of the present invention. Upon receiving an RTO request from a processor for a target cache line (step 1602), the system examines the record of speculative store operations (step 1604). If there exists a matching speculative store operation, the source processor that currently holds the target cache line passes the target cache line to the requesting processor in the write-only state (step 1606). The source processor also invalidates in the target cache line in its local L2 cache. Note that the cache line may be subsequently passed along to another requesting processor in write-only state. Finally, upon receiving the move message, the system broadcasts an upgrade message to all processors, so that the processor that currently holds the target cache line can upgrade the state of the target cache line to modify (step 1608).

Dropping Store Operations

Figure 17A:
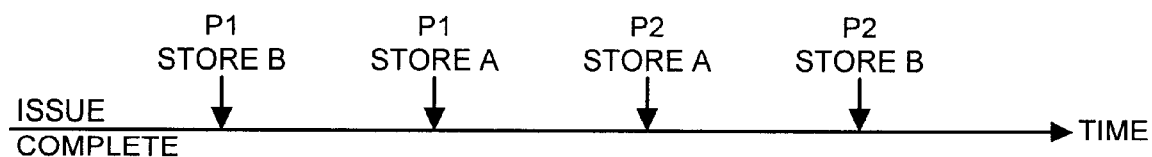
FIG. 17A illustrates a condition when a speculative store operation is directed to the same address as another processor's pending store operation in accordance with an embodiment of the present invention.

Another problematic condition can arise when a speculative store operation is directed to the same address as another processor's pending store operation. Referring to FIG. 17A, assume that address A and address B are located in different banks of L2 cache 106. Also assume that a program executing on processor P1 specifies a store A operation and then a store B operation. Similarly, assume that a program executing on processor P2 specifies a store B operation and then a store A operation.

In FIG. 17A, the store B operation from P1 takes place out-of-order, before the store A operation from P1 takes place. However, this does not affect execution of the program because any load operations that take place between these two store operations is dealt with by previously described mechanisms. Furthermore, no store operations from P2 take place between the two store operations from P1.

Figure 17B:
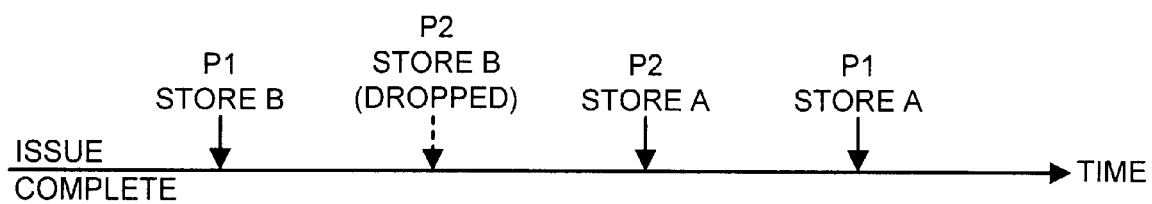
FIG. 17B illustrates a second condition when a speculative store operation is directed to the same address as another processor's pending store operation in accordance with an embodiment of the present invention.

In FIG. 17B, the store B operation from P1 similarly takes place out-of-order, before the store A operation from P1 takes place. However, in this example, a store B operation and a store A operation from P2 take place in between these two store operations from P1. This can be a problem because, after all the stores complete, address A contains the value written by P1, and address B contains the value written by P2. Note that this result cannot occur if the store operations proceed in program order. In order to remedy this problem, the system causes the store operation to address B by P2 to be dropped upon encountering a pending store operation from P1 to the same address. This process is described in more detail below with reference to FIG. 18.

Figure 17C:
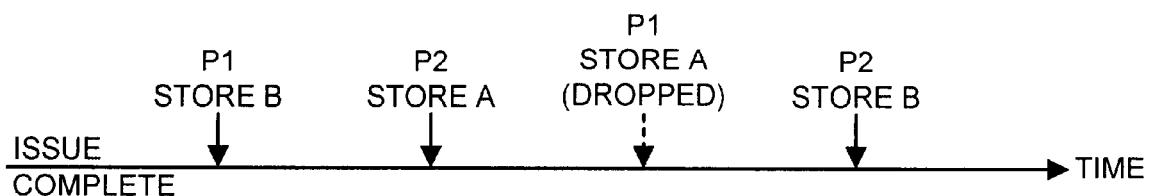
FIG. 17C illustrates a third condition when a speculative store operation is directed to the same address as another processor's pending store operation in accordance with an embodiment of the present invention.

In FIG. 17C, the store B operation from P1 similarly takes place out-of-order, before the store A operation from P1 takes place. However, in this example, the store A operation from P2 takes place in between these two store operations from P1. This can be a problem because, after all the stores complete, address A contains the value written by P1, and address B contains the value written by P2. Note that this result cannot occur if the store operations proceed in program order. In order to remedy this problem, the system causes the store operation to address A by P1 to be dropped upon encountering a pending store operation from P2 to the same address. This process is described in more detail below with reference to FIG. 18.

Figure 18:
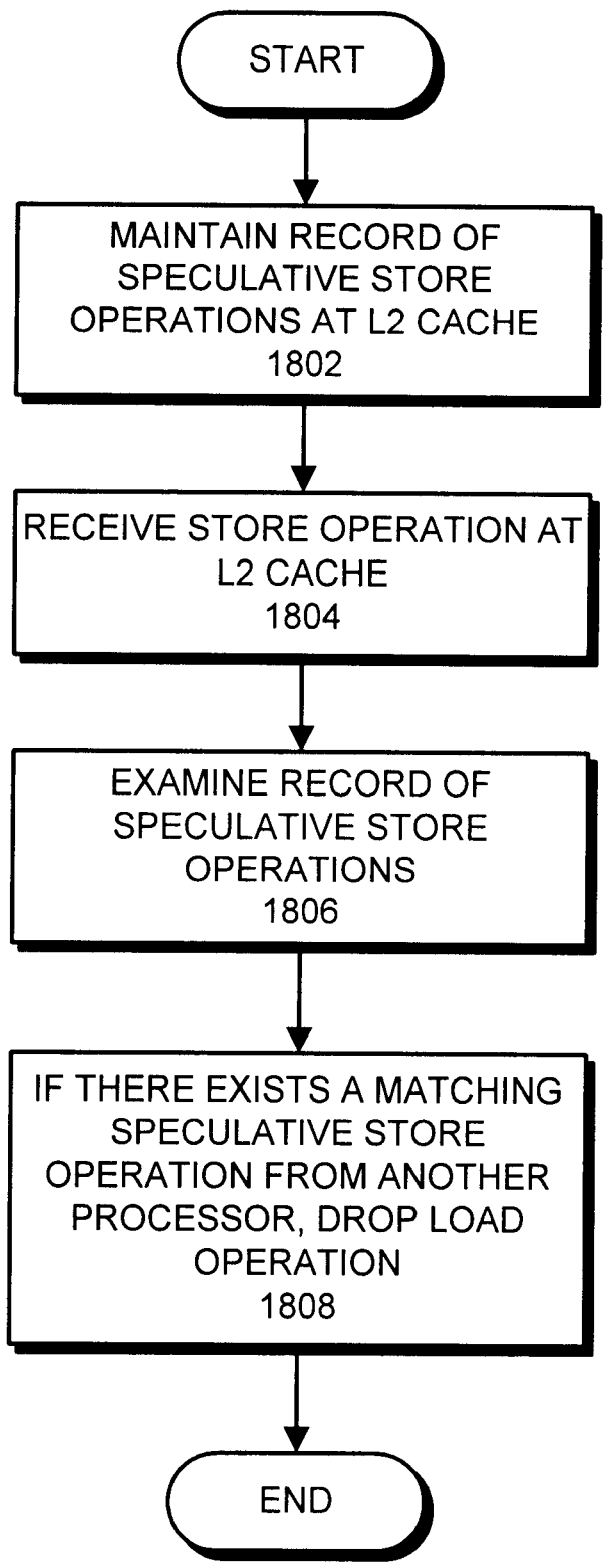
FIG. 18 presents a flow chart illustrating the process of dropping a store operation upon detecting a related speculative store operation in accordance with an embodiment of the present invention.

FIG. 18 is a flow chart illustrating the process of dropping a store operation upon detecting a related speculative store operation in accordance with an embodiment of the present invention. The system starts by maintaining a record of speculative store operations (step 1802). In the embodiment of the present invention illustrated in FIG. 12, this record takes the form of per processor store queues 1206 and 1208.

Next, the system receives a store operation at L2 bank 202 (step 1804). The system then examines the per processor store queues to determine if the store matches any outstanding speculative store operations from other processors (step 1806). If so, the system drops the store operation by removing it from the per processor store queue (step 1808).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating speculative load operations in a multiprocessor system, comprising:

maintaining a record at an L2 cache of speculative load operations that have returned data values through the L2 cache to associated L1 caches;

wherein a speculative load operation is a load operation that is speculatively initiated before a preceding load operation has returned;

wherein for each returned speculative load operation, the record contains information identifying an L1 cache associated with the speculative load operation; and in response to an invalidation event, invalidating a target line in the L2 cache, performing a lookup into the record to identify affected L1 caches that are associated with speculative load operations that may be affected by the invalidation of the target line in the L2 cache, and sending replay commands to the affected L1 caches in order to replay the affected speculative load operations, so that the affected speculative load operations take place after invalidation of the target line in the L2 cache.

2. The method of claim 1, wherein maintaining the record involves:

receiving a load miss operation from an L1 cache at the L2 cache, wherein the load miss operation contains information specifying whether there exists a speculative load operation that has returned for an L1 cache location associated with the load miss operation; and if there exists such a speculative load operation, updating the record to indicate that the L1 cache is associated with the speculative load operation.

3. The method of claim 2, wherein the load miss operation identifies the L1 cache location associated with the load miss operation; and wherein updating the record involves recording the L1 cache location in the record, thereby enabling a subsequent replay command to include the L1 cache location.

4. The method of claim 3, wherein if load miss operation is not speculative, the method further comprises updating the record to indicate that an associated entry in the L1 cache is not associated with a returned speculative load operation.

5. The method of claim 1, further comprising, if replay commands are sent to one or more L1 caches for an L2 cache line, updating the record to indicate that the L2 cache line is no longer associated with returned speculative load operations.

6. The method of claim 1, wherein the L2 cache includes a reverse directory including entries for lines in L1 caches, wherein each entry identifies an associated entry in the L2 cache.

7. The method of claim 6, wherein the reverse directory includes a fixed entry corresponding to each entry in each of the L1 caches.

8. The method of claim 7, wherein each entry in the reverse directory includes information specifying a location of a corresponding entry in the L2 cache.

9. The method of claim 1, wherein the invalidation event includes a cache coherency protocol operation.

10. The method of claim 1, wherein the invalidation event includes a store operation associated with the target line in the L2 cache.

11. The method of claim 1, wherein the multiprocessor system implements a total store ordering memory model in which loads can overtake previous stores, loads cannot overtake previous loads, stores cannot overtake previous loads, and stores cannot overtake previous stores.

12. An apparatus that facilitates speculative load operations in a multiprocessor system, comprising:
    an L2 cache;
    a record at the L2 cache containing information identifying speculative load operations that have returned data values through the L2 cache to associated L1 caches;
    wherein a speculative load operation is a load operation that is speculatively initiated before a preceding load operation has returned;
    wherein for each returned speculative load operation, the record contains information identifying an L1 cache associated with the speculative load operation;
    an invalidation mechanism that is configured to invalidate a target line in the L2 cache in response to an invalidation event;
    a replay mechanism, wherein in response to the invalidation event, the replay mechanism is configured to,
        perform a lookup into the record to identify affected L1 caches that are associated with speculative load operations that may be affected by the invalidation of the target line in the L2 cache, and to
        send replay commands to the affected L1 caches in order to replay the affected speculative load operations, so that the affected speculative load operations take place after invalidation of the target line in the L2 cache.

13. The apparatus of claim 12, further comprising an updating mechanism associated with the record that is configured to receive a load miss operation from an L1 cache, wherein the load miss operation contains information specifying whether there exists a speculative load operation that has returned for an L1 cache location associated with the load miss operation;
    wherein if there exists such a speculative load operation, the updating mechanism is configured to update the record to indicate that the L1 cache is associated with the speculative load operation.

14. The apparatus of claim 13,
    wherein the load miss operation identifies the L1 cache location associated with the load miss operation; and
    wherein updating mechanism is configured to record the L1 cache location in the record, thereby enabling a subsequent replay command to include the L1 cache location.

15. The apparatus of claim 14, wherein if load miss operation is not speculative, the updating mechanism is configured to update the record to indicate that an associated entry in the L1 cache is not associated with a returned speculative load operation.

16. The apparatus of claim 13, wherein if replay commands are sent to one or more L1 caches for an L2 cache line, the updating mechanism is configured to update the record to indicate that the L2 cache line is no longer associated with returned speculative load operations.

17. The apparatus of claim 12, further comprising a reverse directory coupled to the L2 cache, wherein the reverse directory includes entries for lines in L1 caches, wherein each entry identifies an associated entry in the L2 cache.

18. The apparatus of claim 17, wherein the reverse directory includes a fixed entry corresponding to each entry in each of the L1 caches.

19. The apparatus of claim 18, wherein each entry in the reverse directory includes information specifying a location of a corresponding entry in the L2 cache.

20. The apparatus of claim 12, wherein the invalidation event includes a cache coherency protocol operation.

21. The apparatus of claim 12, wherein the invalidation event includes a store operation associated with the target line in the L2 cache.

22. The apparatus of claim 12, wherein the multiprocessor system implements a total store ordering memory model in which loads can overtake previous stores, loads cannot overtake previous loads, stores cannot overtake previous loads, and stores cannot overtake previous stores.

23. A multiprocessor system that facilitates speculative load operations, comprising:
    a plurality of processors;
    a plurality of L1 caches coupled to the plurality of processors;
    an L2 cache coupled to the plurality of L1 caches;
    a record at the L2 cache containing information identifying speculative load operations that have returned data values through the L2 cache to associated L1 caches;
    wherein a speculative load operation is a load operation that is speculatively initiated before a preceding load operation has returned;
    wherein for each returned speculative load operation, the record contains information identifying an L1 cache associated with the speculative load operation;
    an invalidation mechanism that is configured to invalidate a target line in the L2 cache in response to an invalidation event;
    a replay mechanism, wherein in response to the invalidation event, the replay mechanism is configured to,
        perform a lookup into the record to identify affected L1 caches that are associated with speculative load operations that may be affected by the invalidation of the target line in the L2 cache, and to
        send replay commands to the affected L1 caches in order to replay the affected speculative load operations, so that the affected speculative load operations take place after invalidation of the target line in the L2 cache.

24. The multiprocessor system of claim 23, further comprising an updating mechanism associated with the record that is configured to receive a load miss operation from an L1, wherein the load miss operation contains information specifying whether there exists a speculative load operation that has returned for an L1 cache location associated with the load miss operation;
    wherein if there exists such a speculative load operation, the updating mechanism is configured to update the record to indicate that the L1 cache is associated with the speculative load operation.

25. The multiprocessor system of claim 23, further comprising a reverse directory coupled to the L2 cache, wherein the reverse directory includes entries for lines in L1 caches, wherein each entry identifies an associated entry in the L2 cache.

* * * * *

UNITED STATES PATENT AND TRADEMARK OFFICE
CERTIFICATE OF CORRECTION

PATENT NO. : 6,721,855 B2
DATED : April 13, 2004
INVENTOR(S) : Chaudhry et al.

It is certified that error appears in the above-identified patent and that said Letters Patent is hereby corrected as shown below:

Title page,
Item [73], Assignee, please delete "Microsysytems" and replace with the word
-- Microsystems --.

Signed and Sealed this

Sixth Day of July, 2004

JON W. DUDAS
*Acting Director of the United States Patent and Trademark Office*